US007930466B2

(12) United States Patent  
Ishii et al.

(10) Patent No.: US 7,930,466 B2  
(45) Date of Patent: Apr. 19, 2011

(54) STORAGE TERMINAL, INFORMATION PROCESSING APPARATUS, AND INFORMATION PROCESSING SYSTEM

(75) Inventors: Nobutake Ishii, Tokyo (JP); Atsushi Narusawa, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 612 days.

(21) Appl. No.: 12/015,983

(22) Filed: Jan. 17, 2008

(65) Prior Publication Data

US 2008/0215795 A1    Sep. 4, 2008

(30) Foreign Application Priority Data

Mar. 1, 2007 (JP) ................................. 2007-051952

(51) Int. Cl.  
*G06F 12/00* (2006.01)

(52) U.S. Cl. ......... 711/100; 711/103; 711/154; 711/156

(58) Field of Classification Search .......................... None  
See application file for complete search history.

(56) References Cited

U.S. PATENT DOCUMENTS

| 5,673,322 | A | 9/1997 | Pepe et al. |
| 5,787,259 | A | 7/1998 | Haroun et al. |
| 6,795,872 | B2 | 9/2004 | Page et al. |

| 2006/0200612 | A1 | 9/2006 | Hamid et al. |
| 2006/0218349 | A1 | 9/2006 | Oe et al. |
| 2007/0171921 | A1* | 7/2007 | Wookey et al. ............... 370/401 |

FOREIGN PATENT DOCUMENTS

| JP | A-11-507152 | 6/1999 |
| JP | A-2000-508792 | 7/2000 |
| JP | A-2004-5637 | 1/2004 |
| JP | A-2005-266934 | 9/2005 |
| JP | A-2006-268486 | 10/2006 |
| WO | WO 97/35402 A1 | 9/1997 |
| WO | WO 97/37202 A1 | 10/1997 |
| WO | WO 2005/099412 A2 | 10/2005 |
| WO | WO 2006/092042 A1 | 9/2006 |

* cited by examiner

*Primary Examiner* — Shawn X Gu  
(74) *Attorney, Agent, or Firm* — Oliff & Berridge, PLC

(57) ABSTRACT

A storage terminal includes a storage unit, a communication unit, and a controlling unit. The storage unit stores first information and second information. The first information is information that is displayed according to a procedure defined in an Internet browser program. The second information is information that is output according to a procedure defined in a program different from the Internet browser program. The communication unit carries out communications with an information processing apparatus on which the Internet browser program is executed. The controlling unit executes processing according to a request received from the information processing apparatus, by executing an Internet server program. The first information is transmitted according to a communication standard for communications by the storage terminal, and the second information is read and transmitted according to a read/write standard for reading and/or writing to the storage unit.

9 Claims, 8 Drawing Sheets

US 7,930,466 B2

STORAGE TERMINAL, INFORMATION PROCESSING APPARATUS, AND INFORMATION PROCESSING SYSTEM

BACKGROUND

1. Technical Field

The present invention relates to techniques fox exchanging information with a storage terminal.

2. Related Art

Flash memories called USB (Universal Serial Bus) memories are commonly available. A USB memory can be connected to or disconnected from a host apparatus having a USB port. By connecting a USB memory to a USB port of a host apparatus, a user of the host apparatus can execute various types of processing, such as reading or deleting data stored in the USB memory or writing data to the USB memory. For example, according to techniques disclosed in JP-A-2005-266934, data can be read from a USB memory according to the Mass Storage Class, which is a standard for reading or writing data.

With the recent development of the Internet, attempts are being made to allow various devices to function as WWW (World Wide Web) clients or WWW servers. On the Internet, Internet communication protocols, such as the HyperText Transfer Protocol (HTTP) or the Transmission Control Protocol/Internet Protocol (TCP/IP), are used. These protocols can be used, for example, in an attempt to allow a USB memory to function as a WWW server. However, with such Internet communication protocols, many steps have to be taken to establish communications between the USB memory and a host apparatus. Thus, it takes certain time to exchange data. Usually, data is exchanged very rapidly between the USB memory and the host apparatus. Thus, such an increase in processing time is a serious problem for users.

SUMMARY

An advantage of some aspects of the invention is that information can be exchanged rapidly with a storage terminal that functions as an Internet server.

According to an aspect of the invention, there is provided a storage terminal. The storage terminal includes a storage unit that stores first information and second information, the first information being information that is displayed according to a procedure defined in an Internet browser program, and the second information being information that is output according to a procedure defined in a program different from the Internet browser program; a communication unit that carries out communications with an information processing apparatus on which the Internet browser program is executed; and a controlling unit that executes processing according to a request received from the information processing apparatus, by executing an Internet server program. When the request received from the information processing apparatus by the communication unit is a request specifying the first information, the controlling unit reads the specified first information from the storage unit, and sends the first information from the communication unit to the information processing apparatus according to a communication standard for communications by the storage terminal. When the request received from the information processing apparatus by the communication unit is a request specifying the second information, the controlling unit reads the specified second information from the storage unit, and sends the second information from the communication unit to the information processing apparatus according to a read/write standard for reading information from or writing information to the storage unit.

Preferably, the first information is information written in a markup language that is parsed by the Internet browser program, and the second information includes at least one of data of music that is played back according to a procedure defined in a music processing program, data of an image that is displayed according to a procedure defined in an image processing program, and data of a document that is displayed according to a procedure defined in a document processing program. In this case, when the request received is a request generated by encapsulating specification information specifying the first information according to an Internet communication protocol used on the Internet and further encapsulating resulting data according to the communication standard for communications by the storage terminal, the controlling unit decapsulates the request to extract the specification information, and encapsulates a piece of first information specified by the specification information among the first information stored in the storage unit according to the Internet communication protocol, further encapsulates resulting data according to the communication standard, and sends resulting data to the information processing apparatus. When the request received is a request generated by encapsulating specification information specifying the second information according to the Internet communication protocol and further encapsulating resulting data according to the communication standard, the controlling unit decapsulates the request to extract the specification information, attaches a command for allowing the information processing apparatus to control the storage terminal as a peripheral device to a piece of second information specified by the specification information among the second information stored in the storage unit, encapsulates resulting data according to the read/write standard for reading information from or writing information to the storage unit, and sends resulting data to the information processing apparatus.

According to another aspect of the invention, there is provided a storage terminal. The storage terminal includes a storage unit that stores first information and second information, the first information being information that is displayed according to a procedure defined in an Internet browser program, and the second information being information that is output according to a procedure defined in a program different from the Internet browser program; a communication unit that carries out communications with an information processing apparatus on which the Internet browser program is executed; and a controlling unit that executes processing according to a request received from the information processing apparatus, by executing an Internet server program. When the request received from the information processing apparatus by the communication unit is a request specifying the first information or the second information, the controlling unit reads the specified first information or second information from the storage unit, and sends the first Information or second information from the communication unit to the information processing apparatus according to a read/write standard for reading information from or writing information to the storage unit.

Preferably, the first information is information written in a markup language that is parsed by the Internet browser program, and the second information includes at least one of data of music that is played back according to a procedure defined in a music processing program, data of an image that is displayed according to a procedure defined in an image processing program, and data of a document that is displayed according to a procedure defined in a document processing program. In this case, when the request received is a request generated by encapsulating specification information specifying the first information according to an Internet communication protocol used on the Internet and further encapsulating resulting data according to the read/write standard for reading information from or writing information to the storage unit, the controlling unit decapsulates the request to extract the specification information, and encapsulates a piece of first information specified by the specification information among the first information stored in the storage unit according to the Internet communication protocol, further encapsulates resulting data according to the read/write standard, and sends resulting data to the information processing apparatus. When the request received is a request generated by encapsulating specification information specifying the second information according to the Internet communication protocol and further encapsulating resulting data according to the read/write standard, the controlling unit decapsulates the request to extract the specification information, attaches a command for allowing the information processing apparatus to control the storage terminal as a peripheral device to a piece of second information specified by the specification information among the second information stored in the storage unit, encapsulates resulting data according to the read/write standard, and sends resulting data to the information processing apparatus.

Preferably, the Internet communication protocol is the Transmission Control Protocol/Internet Protocol, the communication standard for communications by the storage terminal is the Communication Class, the read/write standard for reading information from or writing information to the storage unit is the Mass Storage Class, and the command for allowing the information processing apparatus to control, the storage terminal as a peripheral device is a Small Computer System Interface command.

Also preferably, the communication unit exchanges the request or Information according to the Universal Serial Bus standard.

According to another aspect of the invention, there is provided an information processing apparatus. The information processing apparatus includes a storage unit that stores information; a communication unit that carries out communications with a storage terminal on which an Internet server program is executed; and a controlling unit that reads specified information from the storage unit and that sends the specified information from the communication unit to the storage terminal according to a read/write standard for reading information from or writing information to the storage terminal, by executing an Internet browser program.

According to another aspect of the invention, there is provided an information processing system. The information processing system includes a storage terminal that executes an Internet server program; and an information processing apparatus that executes an Internet browser program. The storage terminal includes a storage unit that stores first information and second information, the first information being information that is displayed according to a procedure defined in the Internet browser program, and the second information being information that is output according to a procedure defined in a program different from the Internet browser program; a communication unit that carries out communications with the information processing apparatus; and a controlling unit that executes processing according to a request received from the information processing apparatus, by executing the Internet server program. When the request received from the information processing apparatus by the communication unit is a request specifying the first information, the controlling unit reads the specified first information from the storage unit, and sends the first information from the communication unit to the information processing apparatus according to a communication standard for communications by the storage terminal. When the request received from the information processing apparatus by the communication unit is a request specifying the second information, the controlling unit reads the specified second information from the storage unit, and sends the second information from the communication unit to the information processing apparatus according to a read/write standard for reading information from or writing information to the storage unit. The information processing apparatus includes an executing unit that executes the Internet browser program; a sending unit that sends a request specifying the first information or the second information to the storage terminal; and a receiving unit that receives the first information or the second information sent from the communication unit of the storage terminal.

According to another aspect of the invention, there is provided an information processing system. The information processing system includes a storage terminal that executes an Internet server program; and an information processing apparatus that executes an Internet browser program. The storage terminal includes a storage unit that stores first information and second information, the first information being information that is displayed according to a procedure defined in the Internet browser program, and the second information being information that is output according to a procedure defined in a program different from the Internet browser program; a communication unit that carries out communications with the information processing apparatus; and a controlling unit that executes processing according to a request received from the information processing apparatus, by executing the Internet server program. When the request received from the information processing apparatus by the communication unit is a request specifying the first information or the second information, the controlling unit reads the specified first information or second information from the storage unit, and sends the first information or second information from the communication unit to the information processing apparatus according to a read/write standard for reading information from or writing information to the storage unit. The information processing apparatus includes an executing unit that executes the Internet browser program; a sending unit that sends a request specifying the first information or the second information to the storage terminal; and a receiving unit that receives the first information or the second information sent from the communication unit of the storage terminal.

According to another aspect of the invention, there is provided an information processing system. The Information processing system includes a storage terminal that executes an Internet server program; and an information processing apparatus that executes an Internet browser program. The information processing apparatus includes a first storage unit that stores information; a communication unit that carries out communications with the storage terminal; and a controlling unit that reads specified information from the first storage unit and that sends the specified information from the communication unit to the storage terminal according to a read/write standard for reading information from or writing information to the storage terminal, by executing the Internet browser program. The storage terminal includes a second storage unit that stores information; a communication unit that carries out communications with the information processing apparatus; and a controlling unit that stores information received from the information processing apparatus by the communication unit in the second storage unit, by executing the Internet server program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Now, embodiments of the invention will be described.

(1) First Embodiment (1-1) Configuration

Figure 1:
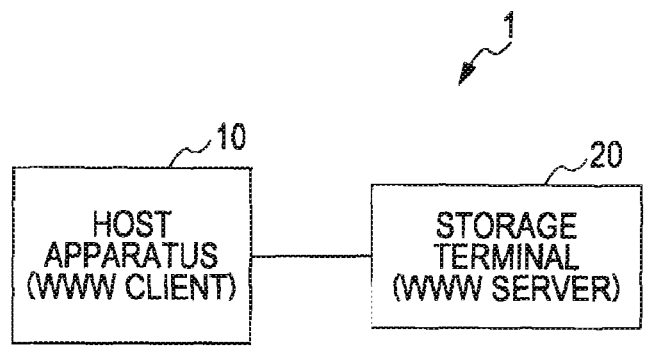
FIG. 1 is a block diagram showing the configuration of an information processing system.

FIG. 1, is a block diagram showing the configuration of an information processing system 1 according to a first embodiment of the invention. Referring to FIG. 1, the information processing system 1 includes a host apparatus 10 that functions as a WWW client, and a storage terminal 20 that functions as a WWW server. The host apparatus 10 is an information processing apparatus, such as a personal computer, a personal digital assistant (PDA), a cellular phone, or a display terminal called electronic paper. The storage terminal 20 is a terminal that can be connected to a host apparatus 10 that stores information, such as an auxiliary storage terminal called a USB memory. The storage terminal 20 has a connection interface, such as a USB connector. By connecting the USB connector with a USB port of the host apparatus 10, the host apparatus 10 and the storage terminal 20 are allowed to mutually exchange data according to the USB standard.

Next, the configuration of the host apparatus 10 will be described.

Figure 2:
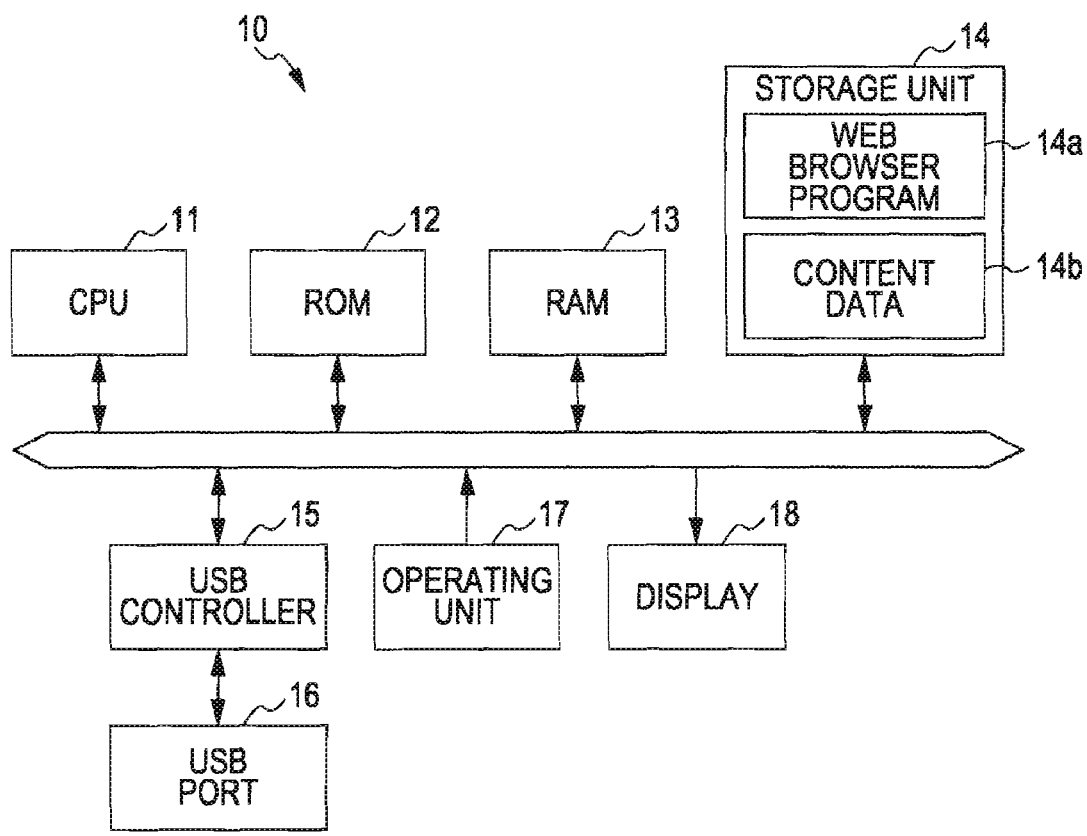
FIG. 2 is a block diagram showing the configuration of a host apparatus.

FIG. 2 is a block diagram showing the configuration of the host apparatus 10. Referring to FIG. 2, the host apparatus 10 includes a central processing unit (CPU) 11, a read-only memory (ROM) 12, a random access memory (PRA) 13, a storage unit 14, a USB controller 15, a USB port 16, an operating unit 17, and a display 18. The CPU 11 reads a program stored in the ROM 12 or the storage unit 14 and loads the program into the RAM 13, and executes the program to control components of the host apparatus 10.

The storage unit 14 is, for example, a hard disk, and the storage unit 14 stores a Web browser program 14a and various types of content data 14b. The Web browser program 14a (Internet browser program) is a program for parsing content data written in a markup language, such as the HyperText Markup Language (HTML) and displaying information corresponding to the content data on the display 18. The content data 14b includes various types of content data, such as data of music that is played back according to a procedure defined in a music processing program, data of an mage that is displayed according to a procedure defined in an image processing program, or data of a document that is displayed according to a procedure defined in a document processing program. The content data 14b includes data downloaded from the storage terminal 20 acting as a WWW server to the host apparatus 10 acting as a F client and stored in the storage unit 14.

The USB controller 15 carries out communications with a USB controller 21 of the storage terminal 20, which will be described later, under the control of the CPU 11. The USB port 16 is connected to a USB connector 23 of the storage terminal 20, which will be described later, either directly or via a USB cable. The operating unit 17 has various keys, and the operating unit 17 outputs a signal corresponding to a key that is pressed to the CPU 11. The display 18 is, for example, a liquid crystal display, and the display 18 displays various screens under the control of the CPU 11.

Next, the configuration of the storage terminal 20 will be described.

Figure 3:
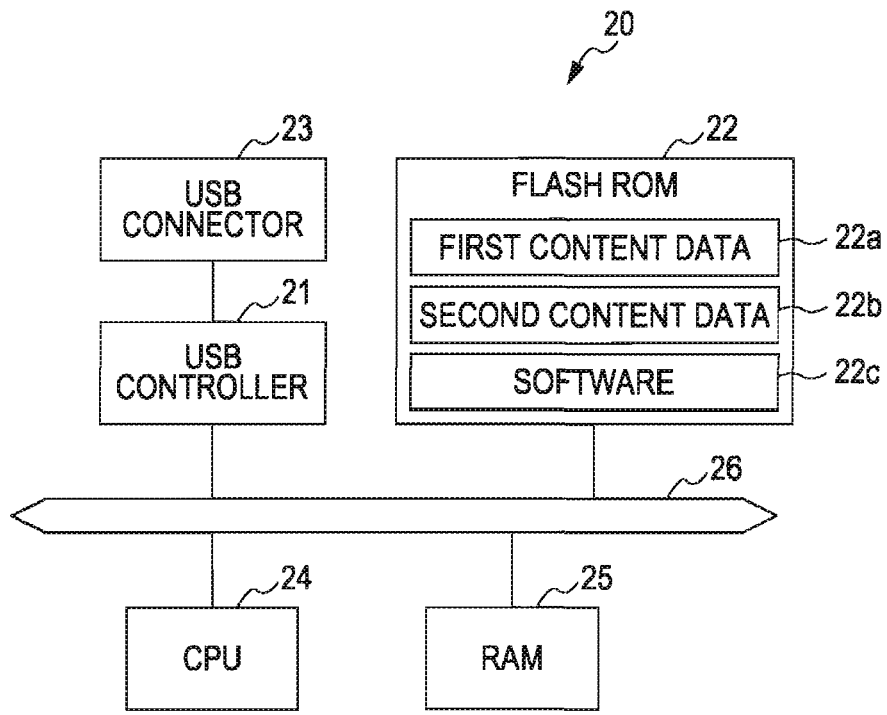
FIG. 3 is a block diagram snowing the configuration of a storage terminal in a first embodiment.

FIG. 3 is a block diagram showing the configuration of the storage terminal 20. Referring to FIG. 3, the storage terminal 20 includes a USB controller 21, a flash ROM 22, a USB connector 23, a CPU 24, a RPM 25, and a bus 26. The USB controller 21 carries out communications with the USB controller 15 of the host apparatus 10 (WWW client) according to the USB standard under the control of the CPU 24. The USB connector 23 is an interface that can be connected to or disconnected from the USB port 16 of the host apparatus 10. The CPU 24 reads a program stored in the flash ROM 22 and loads the program into the RAM 25, and executes the program to control components of the storage terminal 20. The RUM 25 is a work area for the CPU 24.

The flash ROM 22 is formed of a plurality of non-volatile memory devices, such as electrically erasable and programmable read-only memories (EEPROMs) or flash memories. The flash ROM 22 stores first content data 22a, second content data 22b, and software 22c including a plurality of programs. The first content data 22a is written in a markup language, such as HTML, and information corresponding to the first content data 22a is displayed according to a procedure defined in the Web browser program 14a (Internet browser program) stored in the host apparatus 10. In the flash ROM 22, as the first content data 22a, document-management-page data for providing a Web page for document management is stored. The second content data 22b is data that is data that is output according to a procedure defined in a program different from the Web browser program 14a. For example, the second content data 22b includes one or more of data or music that is played back according to a procedure defined in a music processing program, data of an image that is displayed according to a procedure defined in an image processing program, or data of a document that that is displayed according to a procedure defined in a document processing program.

Figure 4:
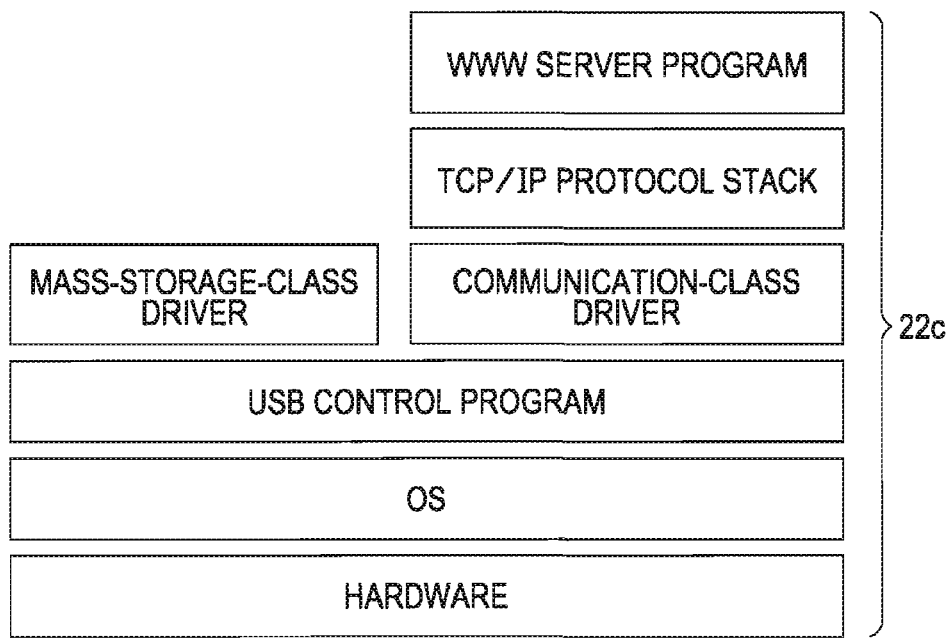
FIG. 4 is a diagram showing a hierarchical structure of software.

FIG. 4 is a diagram showing a hierarchical structure of the software 22c. Referring to FIG. 4, the software 22c has a hierarchical structure including hardware, an operating system (OS) that generally manages various functions of the hardware, such as input/output and storage, a USB control program, a Mass Storage Class driver, a Communication Class driver, a TCP/IP protocol stack, and a WWW server program (Internet server program), in that order from lower to higher layers.

The USB control program is a program that runs on the OS so that data can be exchanged according to the USB standard. The Mass Storage Class driver is a program for exchanging information according to the Mass Storage Class. The Mass Storage Class is a read/write standard according to which the CPU 11 of the host apparatus 10 reads information from or writes information to the flash ROM 22. The Communication Class driver is a program for exchanging information according to the Communication Class. The Communication Class is a communication standard according to which the storage terminal 20 carries out communications. The TCP/IP protocol stack is software supporting a set of protocols used for carrying out communications according to TCP/IP, which is a protocol suite used for communications over the Internet. The WWW server program is a program for distributing content data. By executing the WWW server program, upon receiving a request from the host apparatus 10 (WWW client) processing is executed according to the program.

(1-2) Operation

Figure 5:
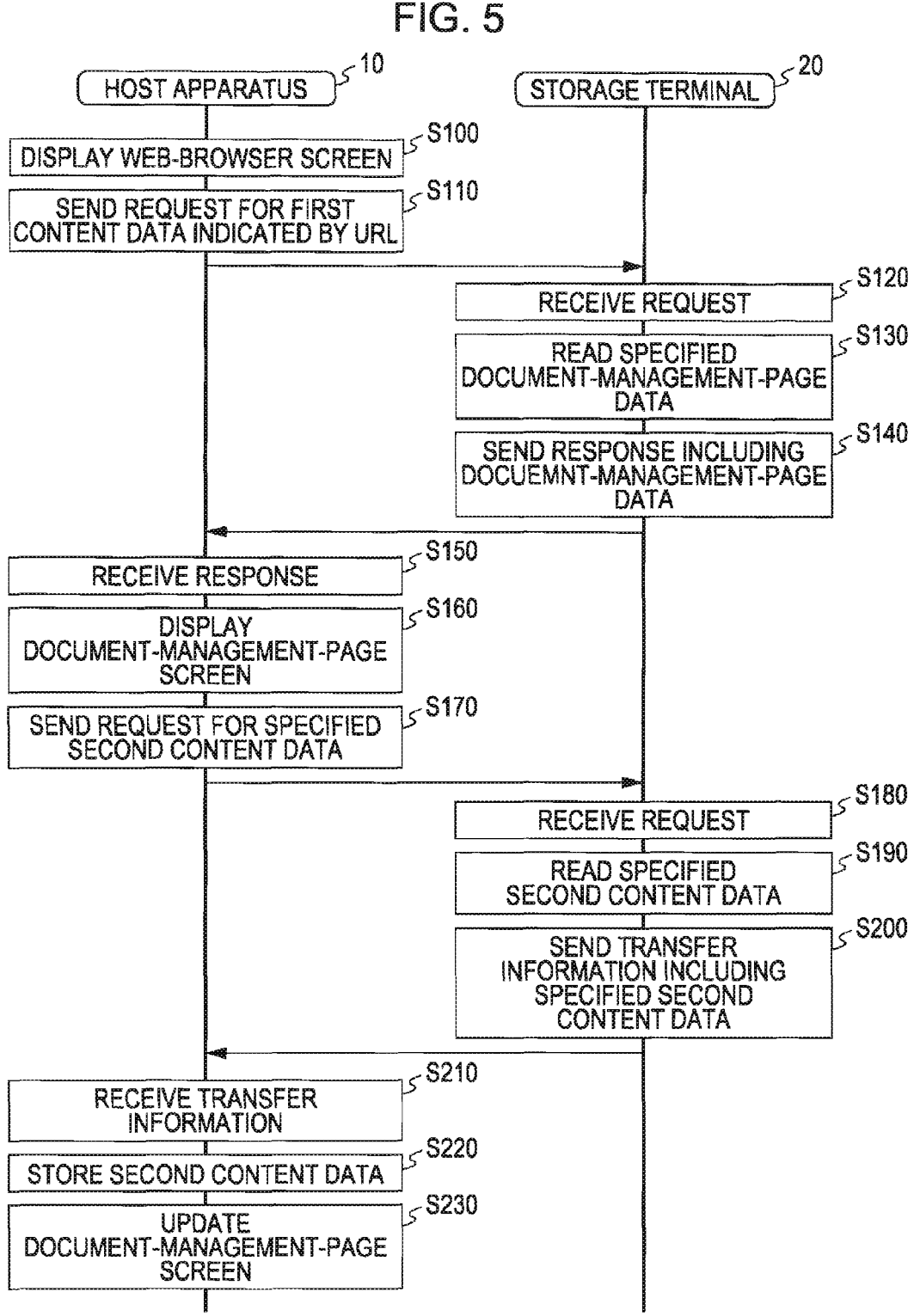
FIG. 5 is a sequence diagram showing an operation in the first embodiment.

Next, an operation in this embodiment will be described with reference to a sequence diagram shown in FIG. 5.

Figure 6:
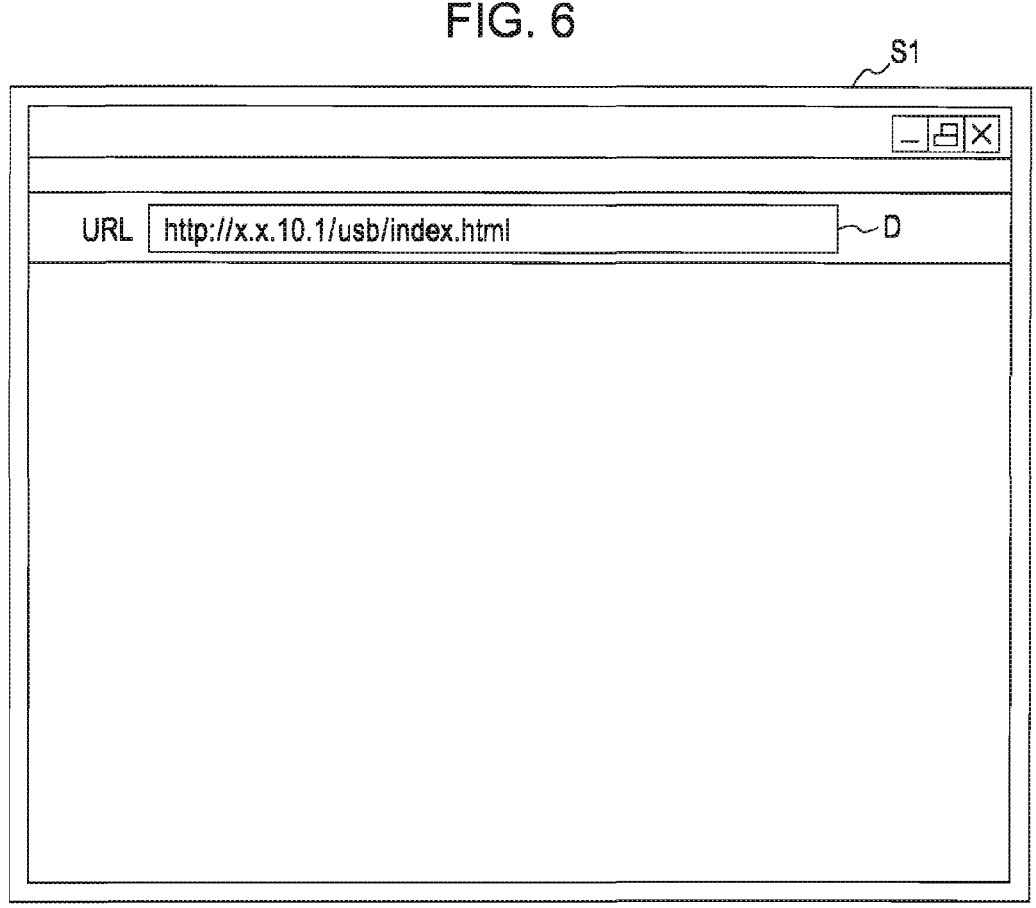
FIG. 6 is an illustration of a Web-browser screen.

When a user has instructed activation of a Web browser by an operation of the operating unit 17 of the host apparatus 10, the CPU 11 executes the Web browser program 14a stored in the storage unit 14 to display a Web-browser screen S1 shown in FIG. 6 on the display 18 (step S100). When the user has input a uniform resource locator (URL) in an address bar D of the Web-browser screen S1 by an operation of the operating unit 17, the CPU 11 sends a request for obtaining the first content data 22a, stored at a location indicated by the input URL, to the storage terminal 20 using the USB controller 15 (step S110).

Figure 7:
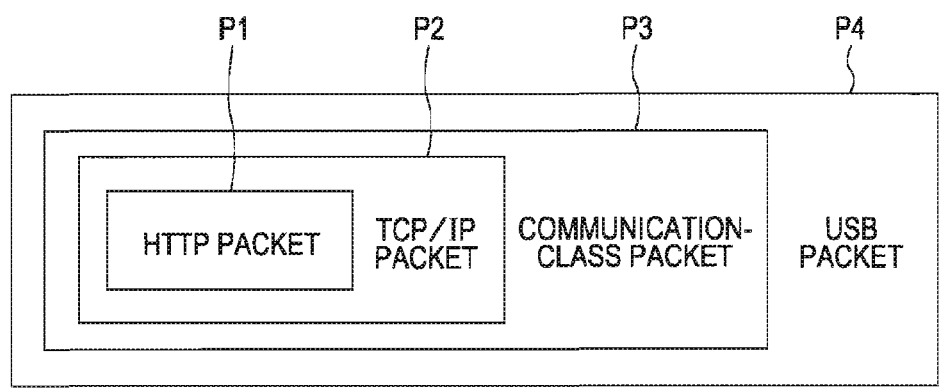
FIG. 7 is a diagram showing a request that is sent in step S1-O.

FIG. 7 is a diagram snowing a request that is sent from the USB controller 15 to the storage terminal 20 in step S10. The request is generated by the CPU 11 in the following manner. For example, let it be supposed that a URL "http://xx.10.1/usb/index.html", indicating the storage location of the document-management-page data as the first content data 22a, is input. In this case, first, an HTTP packet P1 for obtaining the document-management-page data is generated using a "get" command. Then, the HTTP packet P1 is encapsulated according to TCP/IP to form a TCP/IP packet P2. Furthermore, the TCP/IP packet P2 is encapsulated according to the Communication Class to form a Communication Class packet P3. Furthermore, the Communication Class packet P3 is encapsulated according to the USB standard to form a USB packet P4. As a result of these encapsulating steps, the request has a hierarchical structure.

The CPU 24 of the storage terminal 20 receives the request sent from the USB controller 15, using the USB controller 21 (step S120). Then, the CPU 24 decapsulates the received request according to the USB standard, the Communication Class, and TCP/IP, in that order, to extract the HTTP packet P1. Then, the CPU 24 reads the document-management-page data specified by the URL included in the HTTP packet P1 from the flash ROM 22 (step S130). Then, the CPU 24 sends a response including the document-management-page data from the USB controller 21 to the host apparatus 10 according to the Communication Class (step S140).

Figure 8:
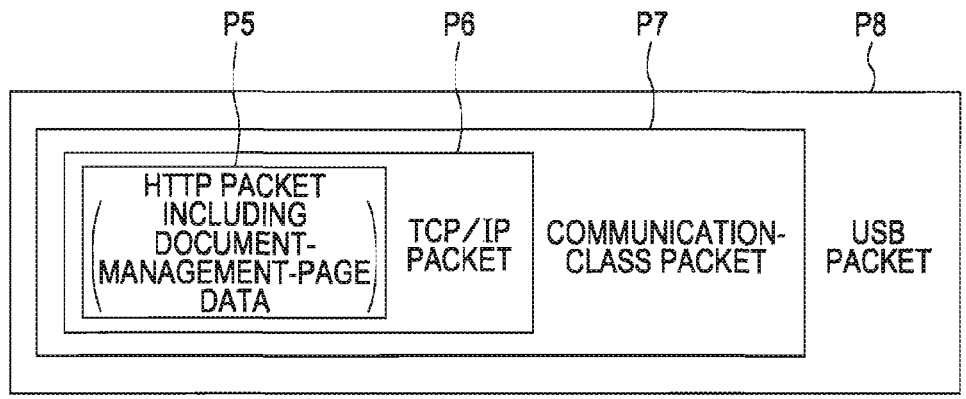
FIG. 8 is a diagram showing a response that is sent in step S140.

FIG. 8 is a diagram showing the response that is sent from the USB controller 21 to the host apparatus 10 in step S140. The response is generated in the following manner. First, an HTTP packet P5 for responding to the request that has been sent is generated using a "response" command. The HTTP packet P5 includes the document-management-page data that has been read. Similarly to the HTTP packet P1 described earlier, the HTTP packet P5 is encapsulated in a hierarchical manner. That is, the response includes the HTTP packet P5, a TCP/IP packet P6, a Communication Class packet P7, and a USB packet P8 in a hierarchical structure.

The CPU 11 of the host apparatus 10 receives the response sent from the USB controller 21, using the USB controller 15 (step 5S150). Then, the CPU 11 decapsulates the response according to the USB standard, the Communication Class, and TCP/IP, in that order, to extract the HTTP packet PD. Then, the CPU 11 displays a document-management-page screen S2 shown in FIG. 9 on the display 18 on the basis of the document-management-page data included in the HTTP packet P5 (step S160). The document-management-page screen S2 is displayed on the basis of the document-management-page data according to a procedure defined in the Web browser program 14a stored in the storage unit 14.

Now, the document-management-page screen S2 will be described. In the document-management-page screen S2, a local file list I1, a storage-terminal file list I2, and transfer buttons B1 and B2 for instructing data transfer are provided. The local file list I1 is a list of property information of individual pieces of the content data 14b stored in the storage unit 14 of the host apparatus 10, including names, types, and dates and times of last update. The property information can be obtained by the CPU 11. In the example shown in FIG. 9, the local file list I1 includes "Folder1", "Folder2", "Folder3", and "text1.txt" as names of individual pieces of the content data 14b. The storage-terminal file list I2 is a list of property information of individual pieces of the second content data 22b stored in the flash ROM 22 of the storage terminal 20, including names, types, and dates and times of last update. In the example shown in FIG. 9, the storage-terminal file list I2 includes "USBFolder1", "USBFolder2", "USBFolder3", and "text1.txt" as names of individual pieces of the second content data 22b. The transfer button B1 is a button used to instruct that a piece of the content data 14b identified by a name included in the local file list I1 be transferred to the flash ROM 22 of the storage terminal 20. The transfer button B2 is a button used to instruct that a piece of the second content data 22b identified by a name included in the storage-terminal file list I2 be transferred to the storage unit 14 of the host apparatus 10.

Now, an example will be considered where the user has specified the piece of the second content data 22b having the name "USBFolder1" in the storage-terminal file list I2 by an operation of the operating unit 17 and then pressed the transfer button B2. Then, the CPU 11 sends a request for obtaining the piece of the second content data 22b having the name "USBFolder1" to the storage terminal 20, using the USB controller 15 (step S170). The request is generated by hierarchically encapsulating an HTTP packet for obtaining the piece of the second content data 22b having the name "USB-Folder1", similarly to the request shown in FIG. 7.

The CPU 24 of the storage terminal 20 receives the request sent from the USB controller 15, using the USB controller 21

(step S180). Then, the CPU 24 decapsulates the request to extract the HTTP packet, and reads the piece of the second content data 22b having the name "USBFolder1", specified by the HTTP packet as content data to be obtained, from the flash ROM 22 (step S190). Then, the CPU 24 sends transfer information including the piece of the second content data 22b having the name "USBFolder1" from the USB controller 21 to the host apparatus 10 according to the Mass Storage Class (step S200).

Figure 10:
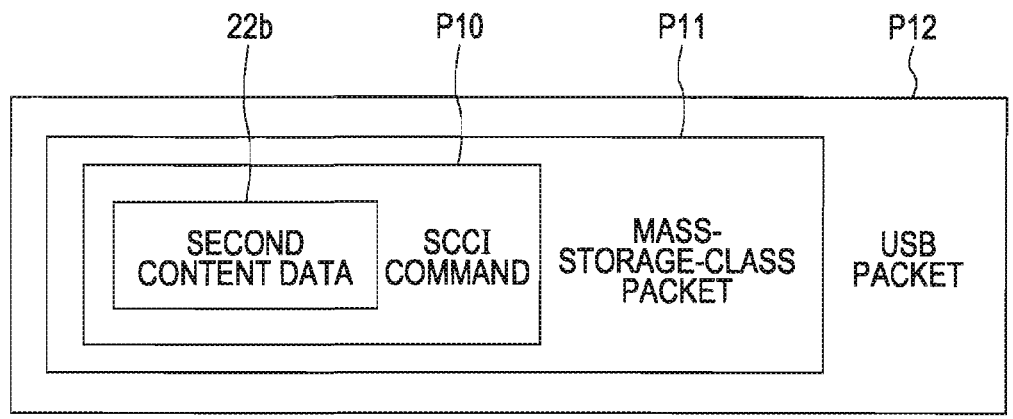
FIG. 10 is a diagram showing transfer information, sent in step S200.

FIG. 10 is a diagram showing the transfer information sent from the USB controller 21 to the host apparatus 10 in step S200. First, a SCSI command P10 is attached to the piece of the second content data 22b having the name "USBFolder1", and the resulting data is encapsulated according to the Mass Storage Class, whereby a Mass Storage Class packet P11 is generated. The SCSI command P10 is a command for operating under the control of the CPU 11 of the host apparatus 10. Furthermore, the Mass Storage Class packet P1 is encapsulated according to the USB standard, whereby a USB packet P12 is generated. That is, the transfer information has a hierarchical structure formed by encapsulating the piece of the second content data 22b having the name "USBFolder1" in order of the SCSI command P10, the Mass Storage Class packet P11, and the USB packet P12.

Figure 11:
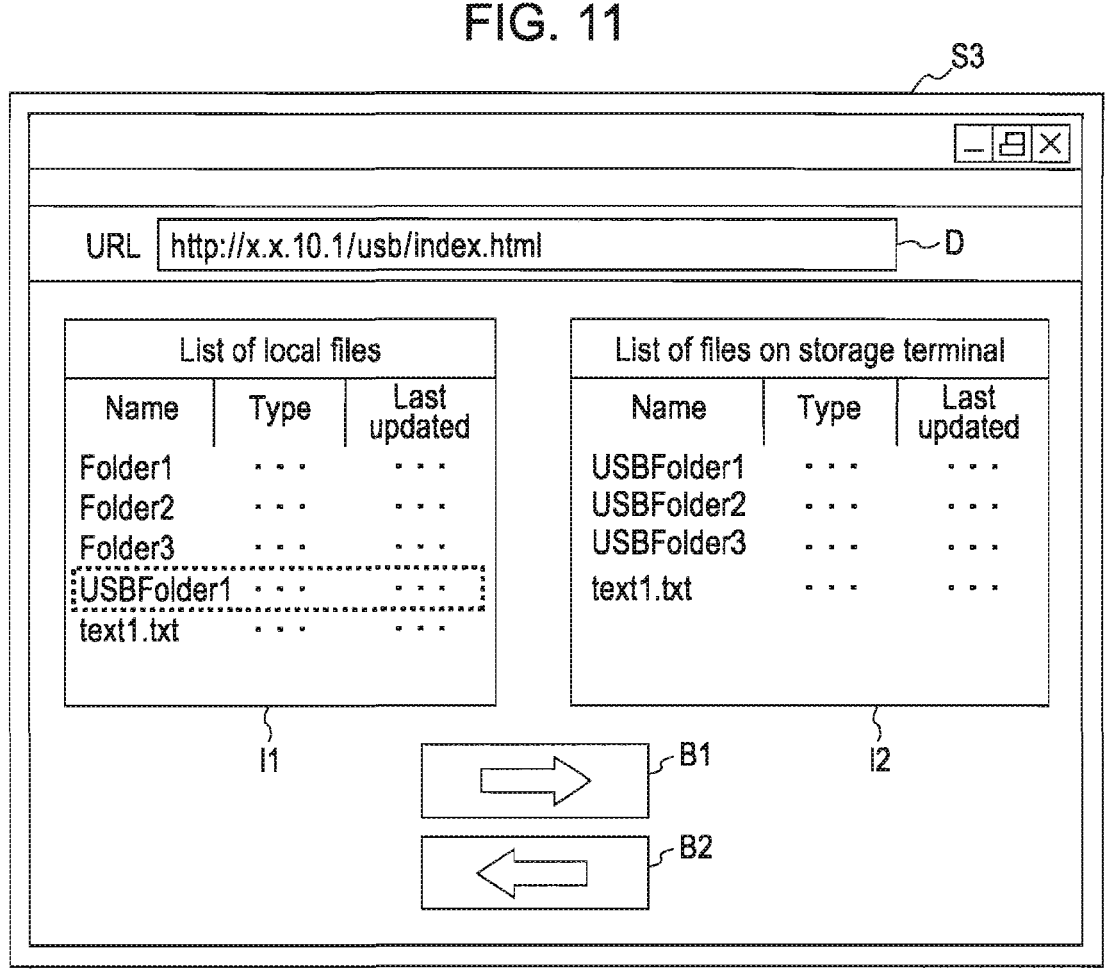
FIG. 11 is an illustration of an updated document-management-page screen.

The CPU 11 of the host apparatus 10 receives the transfer information sent from the USB controller 21, using the USB controller 15 (step S210). The CPU 11 decapsulates the transfer information to extract the piece of the second content data 22b having the name "USBFolder1". Then, the CPU 11 stores the piece of the second content data 22b having the name "USBFolder1" in the storage unit 14 (step S220). Then the piece of the second content data 22b having the name "USB-Folder1" has been transferred from the flash ROM 22 of the storage terminal 20 to the storage unit 14 of the host apparatus 10, the CPU 11 updates the document-management-page screen (step S230). FIG. 11 is an illustration showing an updated document-management-page screen S3. Referring to FIG. 11, in the local file list I1 in the document-management-page screen S3, property information of the piece of the second content data 22b having the name "USBFolder1", including a name, a type, and a date and time of last update, is additionally included.

The above description deals with a case where information is downloaded from the storage terminal 20 acting as a WWW server to the host apparatus 10 acting as a WWW client. In contrast, the following description deals with a case where information is uploaded from the host apparatus 10 acting as a WWW client to the storage terminal 20 acting as a WWW server.

Figure 9:
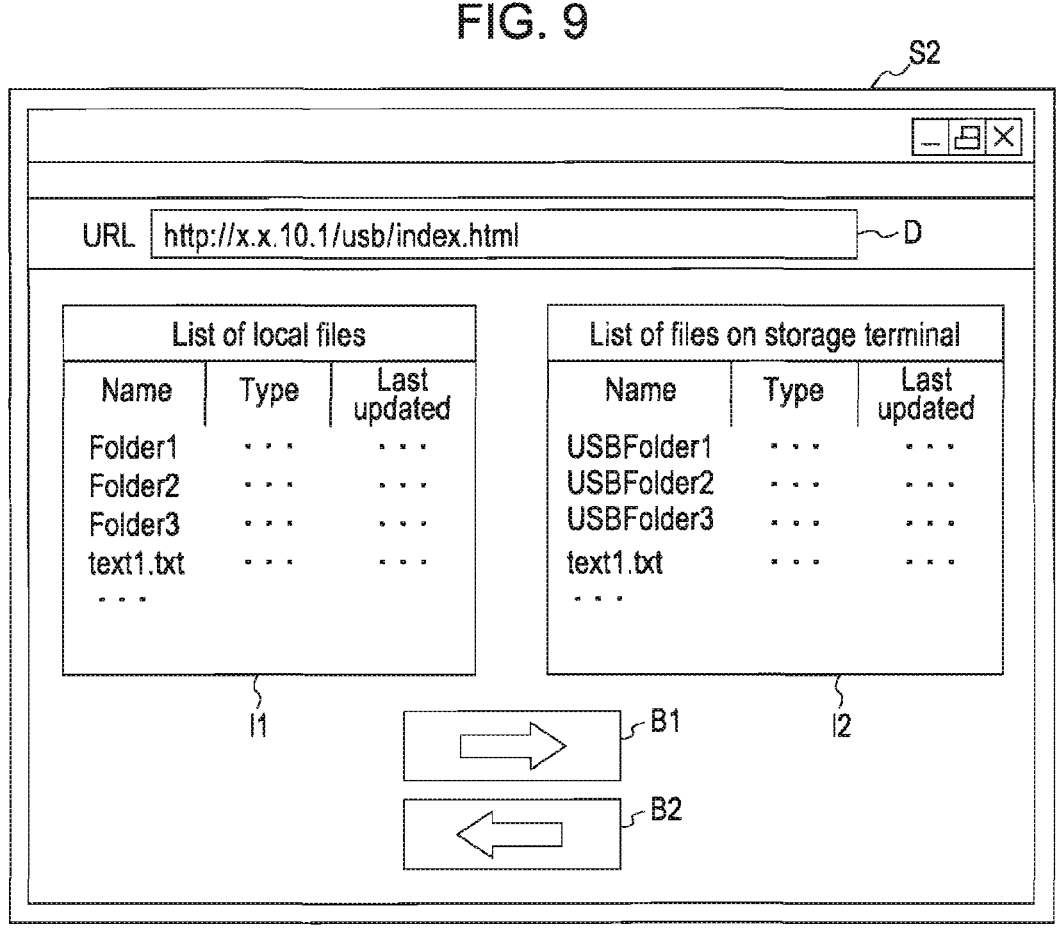
FIG. 9 is an illustration of a document-management-page screen.

Now, an example will be considered where the user has specified the piece of the content data 14b raving the name "Folder1" in the local file list I1 by an operation of the operating unit 17 and then pressed the transfer button B1 in the document-management-page screen S2 shown in FIG. 9. Then, the CPU 11 reads the piece of the content data 14b having the specified name "Folder1" from the storage unit 14, and generates an HTTP packet including the piece of the content data 14b using a "post" command. Furthermore, the CPU 11 encapsulates the HTTP packet according to TCP/IP, encapsulates the resulting TCP/IP packet according 1 to the Mass Storage Class, and encapsulates the resulting Mass Storage Class packet according to the USB standard. The CPU 11 sends the resulting USB packet from the USB controller 15 to the storage terminal 20 as transfer information.

The CPU 24 of the storage terminal 20 receives the transfer information including the piece of the content data 14b, using the USB controller 21. The CPU 24 decapsulates the transfer information to extract the piece of the content data 14b having the name "Folder1". Then, the CPU 24 stores the piece of the content data 14b having the name "Folder1" in the flash ROM 22.

In this manner, information is uploaded from the host apparatus 10 acting as a WWW client to the storage terminal 20 acting as a WWW server.

According to the embodiment described above, the first content data 22a, such as document-management-page data, is sent to the host apparatus 10 according to the Communication Class, and the second content data 22b is transferred to the host apparatus 10 according to the Mass Storage Class. That is, when transferring the second content data 22b, a procedure for establishing communications that is executed when TCP/IP communications are carried out need not be executed. This allows high-speed transfer of the second content data 22b.

Furthermore, also when transferring the content data 14b from the host apparatus 10 to the storage terminal 20, a procedure for establishing communications that is executed when TCP/IP communications are carried out need not be executed, similarly to the case described above. This allows high-speed transfer of the content data 14b.

Furthermore, in the embodiment described above, the CPU 24 of the storage terminal 20 acting as a WWW server executes a program for sending the first content data 22a or transferring the second content data 22b. That is, the host apparatus 10 that receives the first content data 22a or the second content data 22b need not execute a program for obtaining the content data. Thus, the process described above can be executed regardless of the type of OS running on the host apparatus 1. Furthermore, unauthorized users or programs on the side of the host apparatus 10 are prohibited from tampering with or intercepting content data stored on the storage terminal 20. This serves to enhance security.

(2) Second Embodiment

Next, a second embodiment will be described.
(2-1) Configuration

Figure 12:
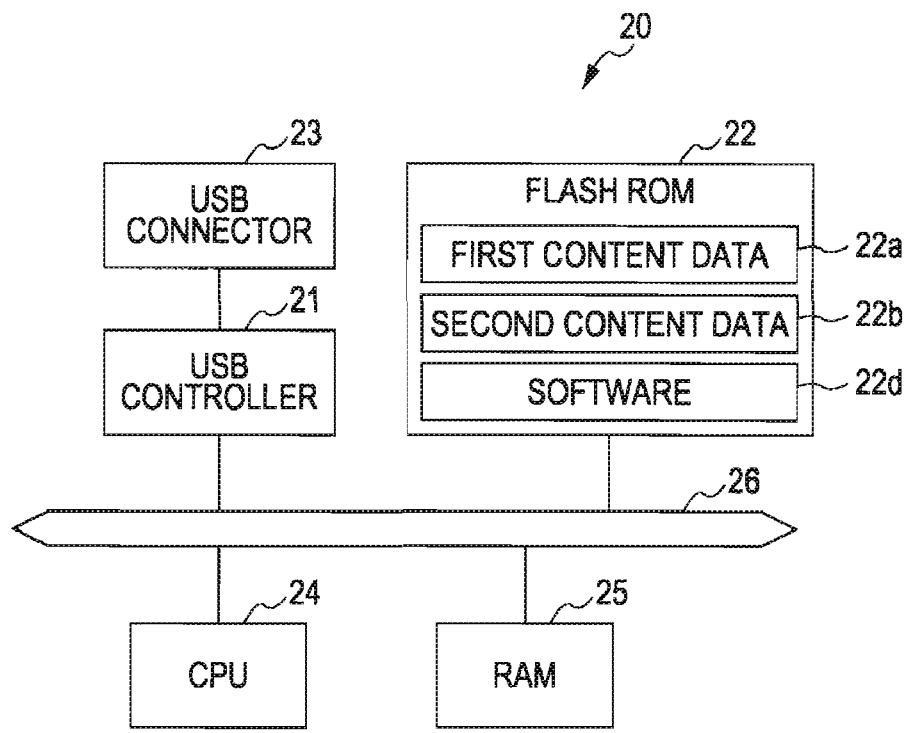
FIG. 12 is a block diagram showing the configuration of a storage terminal in a second embodiment.

The configuration of a host apparatus 10 in the second embodiment is the same as that in the first embodiment shown in FIG. 2, so that description thereof will be omitted. FIG. 12 is a block diagram showing the configuration of a storage terminal 20 in the second embodiment. Referring to FIG. 12, the configuration of the storage terminal 20 in the second embodiment is the same as that in the first embodiment shown in FIG. 3, except what is stored in the flash ROM 22. The storage terminal 20 stores software 22d instead of the software 22c described earlier.

Figure 13:
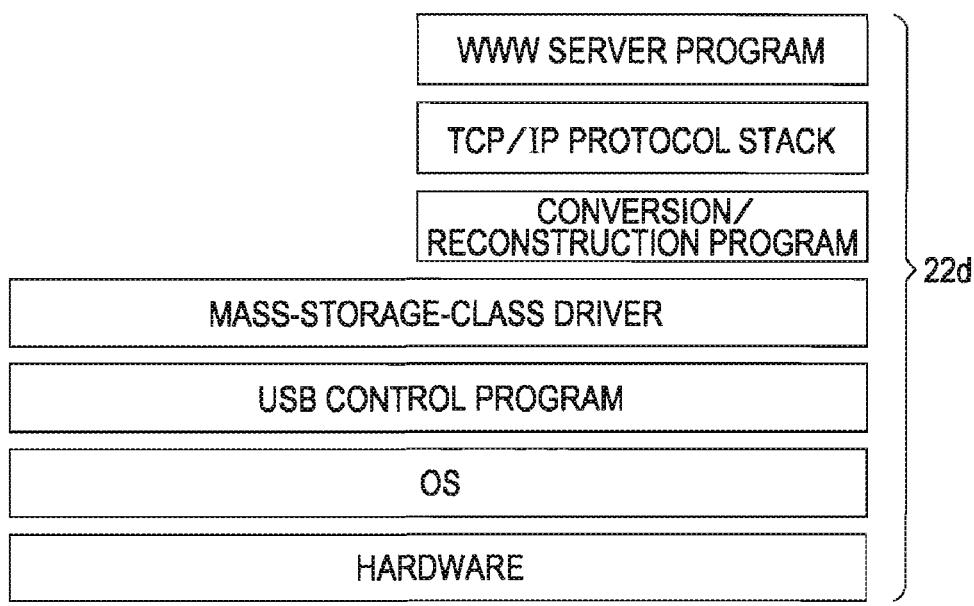
FIG. 13 is a diagram showing a hierarchical structure of software.

FIG. 13 is a diagram showing a hierarchical structure of the software 22d. Referring to FIG. 13, the software 22d has a hierarchical structure including hardware, an OS that generally manages various functions of the hardware, such as input/output and storage, a USB control program, a Mass Storage Class driver, a conversion/reconstruction program, a TCP/IP protocol stack, and a WWW server program, in that order from lower to higher layers. The USE control program, the Mass Storage Class driver, the TCP/IP protocol stack, and the WWW server program are the same as those of the software 22c shown in FIG. 4, so that description thereof will be omitted. Upon receiving a request formed by encapsulation according to TCP/IP and encapsulation according to the Mass Storage Class, the conversion/reconstruction program decapsulates the request according to the Mass Storage Class. Furthermore, the conversion/reconstruction program encapsulates the first content data 22a according to TCP/IP, encapsulates the resulting TCP/IP packet according to the Mass Storage Class, and attaches a flag indicating that a TCP/IP packet is included in a Mass Storage Class packet.

(2-2) Operation

Figure 14:
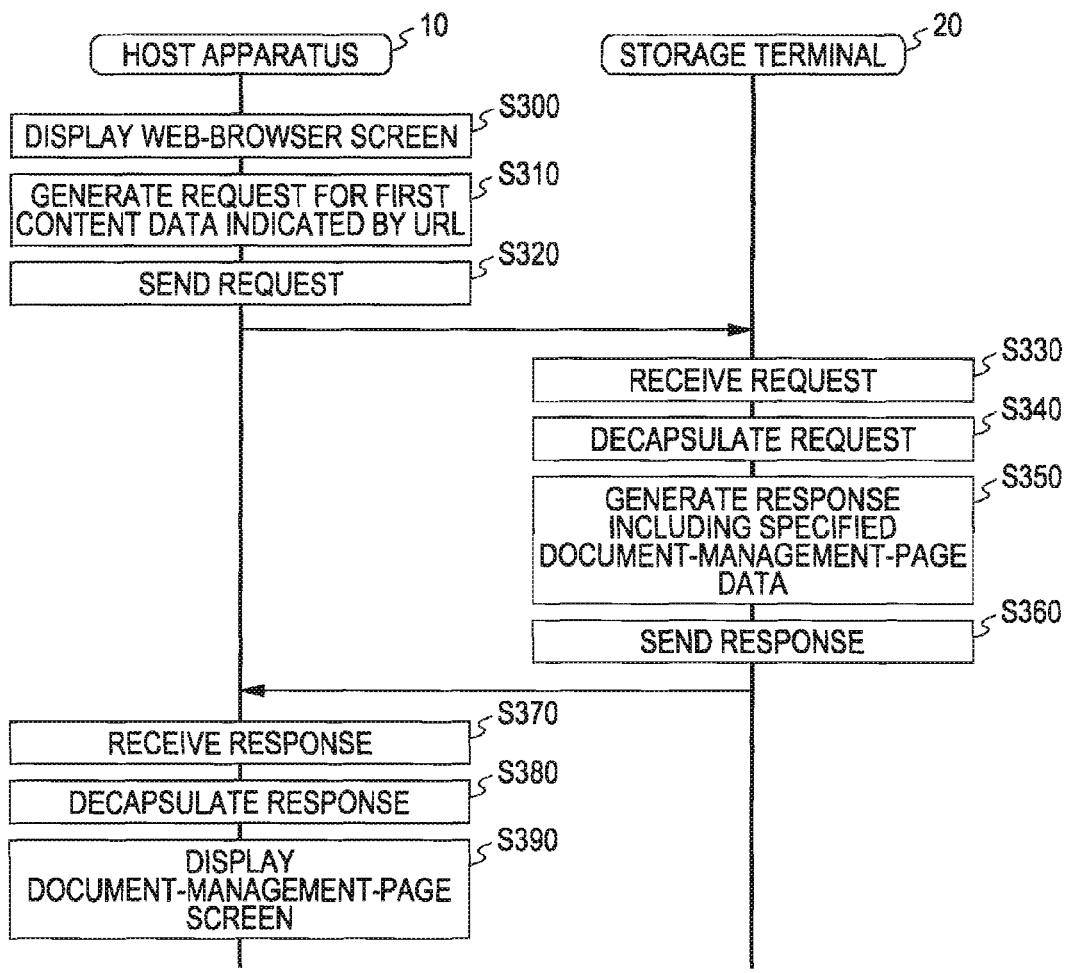
FIG. 14 is a sequence diagram showing an operation in the second embodiment.

Next, an operation in the second embodiment will be described with reference to a sequence diagram shown in FIG. 14.

When the user has instructed activation of a Web browser by an operation of the operating unit 17 of the host apparatus 10, similarly to step S100 described earlier, the CPU 11 executes the Web browser program 14a stored in the storage unit 14 to display the Web browser screen S1 shown in FIG. 6 on the display 18 (step S300). Furthermore, let it be supposed that the user has input the URL "http://x.x.10.1/usb/index.html" in the address bar D of the Web-browser screen S1 by an operation of the operating unit 17, similarly to the case described earlier. Then, the CPU 11 generates a request for obtaining the first content data 22a, stored at the location indicated by the input URL, i.e., document-management-page data (step S310).

Figure 15:
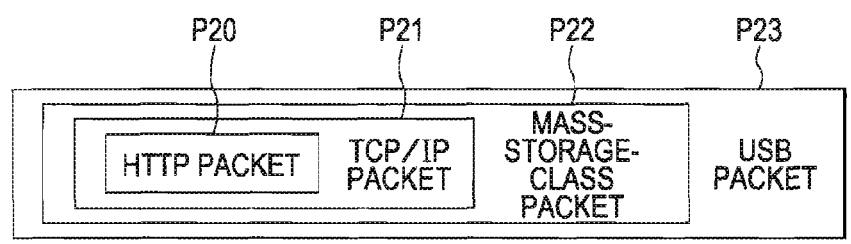
FIG. 15 is a diagram showing a request that is generated in step S310.

FIG. 15 is a diagram showing the request generated by the CPU 11 in step S310. The request is generated in the following manner. First, an HTTP packet P20 for obtaining the document-management-page data is generated using a "get" command. Then, the HTTP packet P20 is encapsulated according to TCP/IP to form a TCP/IP packet P21. Furthermore, the TCP/IP packet P21 is encapsulated according to the Mass Storage Class to form a Mass Storage Class packet P22. Then, the Mass Storage Class packet P22 is encapsulated according to the USB standard to form a USB packet P23. Furthermore, the request has attached thereto a flag indicating that the request has a structure formed by encapsulation according to TCP/IP and further encapsulation according to the Mass Storage Class.

Then, the CPU 11 sends the request to the storage terminal 20, using the USB controller 15 (step S320).

The CPU 24 of the storage terminal 20 receives the request sent from the USB controller 15, using the USB controller 21 (step S330). Then, the CPU 24 decapsulates the request (step S340). First, the USB controller 21 decapsulates the USB packet P23 of the request. Then, when the CPU 24 has determined on the basis of the flag attached to the request that the request has a structure formed by encapsulation according to TCP/IP and further encapsulation according to the Mass Storage Class, the CPU 24 decapsulates the Mass Storage Class packet P23, and further decapsulates the TCP/IP packet P22, thereby extracting the HTTP packet P20.

Then, the CPU 24 generates a response including the document-management-page data specified as content to be obtained by the extracted HTTP packet P20 (step S350). The response has a hierarchical structure, similarly to the request shown in FIG. 15. That is, the request is generated by encapsulating an HTTP packet including a "response-" command for responding to a received request according to TCP/IP, encapsulating the resulting TCP/IP packet according to the Mass Storage Class, and encapsulating the resulting Mass Storage Class packet according to the USB Standard. The HTTP packet includes the document-management-page data read from the flash ROM 22. Furthermore, the response has attached thereto a flag indicating that the response has a structure formed by encapsulation according to TCP/IP and further encapsulation according to the Mass Storage Class. Then, the CPU 24 sends the response from the USB controller 21 to the host apparatus 10 according to the Mass Storage Class (step S360).

The CPU 11 of the host apparatus 10 receives the response sent from the USB controller 21, using the USB controller 15 (Steep S370). Then, the CPU 11 decapsulates the response (step S380). First, the USB controller 15 decapsulates the USB packet of the request. Then, when the CPU 11 has determined on the basis of the flag attached to the request that the response has a structure formed by encapsulation according to TCP/IP and encapsulation according to the Mass Storage Class, the CPU 11 decapsulates the Mass Storage Class packet, and further decapsulates the TCP/IP packet, thereby extracting the HTTP packet including the document-management-page data. Then, the CPU 11 displays the document-management-page screen S2 shown in FIG. 9 on the display 18 on the basis of the document-management-page data included in the extracted HTTP packet (step S390).

The above description deals with a case where information is downloaded from the storage terminal 20 acting as a WWW server to the host apparatus 10 acting as a WWW client. However, similarly to the first embodiment, information can be uploaded from the host apparatus 10 to the storage terminal 20. In that case, processing is executed similarly to the case of the first embodiment, so that detailed description thereof will be omitted.

According to the second embodiment described above, when exchanging information between the storage terminal 20 acting as a WWW server and the host apparatus 10 acting as a WWW client, a procedure for establishing communications that is executed when TCP/IP communications are carried out need not be executed. This serves to achieve high-speed communications. Furthermore, also when transferring the content data 14b from the host apparatus 10 to the storage terminal 20, similarly to the case described above, a procedure for establishing communications that is executed when TCP/IP communications are carried out need not be executed. This allows high-speed transfer of the content data 14b. Furthermore, in the second embodiment, only the Mass Storage Class driver is used, so that the high-speed communications described above can be achieved even if the storage terminal 20 does not have a Communication Class driver.

(3) Modifications

The embodiments described above can be modified as described below. Furthermore, the following modifications may be combined as appropriate.

In the first embodiment, the request for obtaining the piece of the second content data 22b having the name "USB-Folder1", sent in step S170, is generated by encapsulating an HTTP packet according to TCP/IP, encapsulating the resulting TCP/IP packet according to the Communication Class, and encapsulating the resulting Communication Class packet according to the USB standard, as shown in FIG. 7. Alternatively, the request may be generated by encapsulating an HT-P packet according to TCP/IP, encapsulating the resulting TCP/IP packet according to the Mass Storage Class, and encapsulating the resulting Mass Storage Class packet according to the USB standard, as shown in FIG. 15. Upon receiving the request generated through the encapsulating steps described above, the CPU 24 of the storage terminal 20 decapsulates the request to extract the HTTP packet, similarly to step S340 in the second embodiment. Thus, when transferring information between the storage terminal 20 acting as a renew server and the host apparatus 10 acting as a WWW client, a procedure for establishing communications that is executed when TCP/IP communications are carried out need not be executed. This serves to achieve high-speed communications.

In the embodiments described above, a USB memory is used as an example of the storage terminal 20. Alternatively, the storage terminal 20 may be, for example, a digital camera equipped with a memory card.

The embodiments have been described above in the context of examples where the first content data 22a is document-management-page data for providing a page for document management. However, without limitation to the page for document management, content provided by first content data 92a may be, for example, content for providing map information, content for providing music information, or content for providing Web mail.

In the embodiments described above, the CPU 11 executes the Web browser program 14a in response to a user's operation for instructing activation of a Web browser. Alternatively, the CPU 11 may execute the Web browser program 14a in response to detection of connection of the USB connector 23 with the USB port 16 of the host apparatus 10. This saves the user the task of instructing activation of a Web browser by an operation of the operating unit 17

Furthermore, at the time of activation of a web browser, the CPU 11 may display a Web page defined in advance as a page that is to be displayed first. For example, assuming that a document management page is defined as a page that is to be displayed first, when executing the Web browser program 14a, the CPU 11 obtains document-management-page data for providing the document management page, similarly to the case described earlier. Then, when activating a Web browser, the CPU 11 displays the document management page on the basis of the document-management-page data. This saves the user the task of inputting a URL by an operation of the operating unit 17.

A program that is executed by the CPU 24 of the storage terminal 20 or the CPU 11 of the host apparatus 10 can be provided as recorded on recording medium, such as a magnetic tape, a magnetic disk, a flexible disk, an optical recording medium, a magneto-optical recording medium, a compact disk (CD), a digital versatile disk (DVD), or a RAM.

What is claimed is:

1. A storage terminal comprising:
   a storage unit that stores first information and second information, the first information being information that is displayed according to a procedure defined in an Internet browser program, and the second information being information that is output according to a procedure defined in a program different from the Internet browser program;
   wherein the first information is information written in a markup language that is parsed by the Internet browser program, and
   wherein the second information includes at least one of data of music that is played back according to a procedure defined in a music processing program, data of an image that is displayed according to a procedure defined in an image processing program, and data of a document that is displayed according to a procedure defined in a document processing program;
   a communication unit that carries out communications with an information processing apparatus on which the Internet browser program is executed; and
   a controlling unit that executes processing according to a request received from the information processing apparatus, by executing an Internet server program;
   wherein when the request received from the information processing apparatus by the communication unit is a request specifying the first information, the controlling unit reads the specified first information from the storage unit, and sends the first information from the communication unit to the information processing apparatus according to a communication standard for communications by the storage terminal, and when the request received is a request generated by encapsulating specification information specifying the first information according to an Internet communication protocol used on the Internet and further encapsulating resulting data according to the communication standard for communications by the storage terminal, the controlling unit decapsulates the request to extract the specification information, and encapsulates a piece of first information specified by the specification information among the first information stored in the storage unit according to the Internet communication protocol, further encapsulates resulting data according to the communication standard, and sends resulting data to the information processing apparatus, and
   wherein when the request received from the information processing apparatus by the communication unit is a request specifying the second information, the controlling unit reads the specified second information from the storage unit, and sends the second information from the communication unit to the information processing apparatus according to a read/write standard for reading information from or writing information to the storage unit, and when the request received is a request generated by encapsulating specification information specifying the second information according to the Internet communication protocol and further encapsulating resulting data according to the communication standard, the controlling unit decapsulates the request to extract the specification information, attaches a command for allowing the information processing apparatus to control the storage terminal as a peripheral device to a piece of second information specified by the specification information among the second information stored in the storage unit, encapsulates resulting data according to the read/write standard for reading information from or writing information to the storage unit, and sends resulting data to the information processing apparatus.

2. The storage terminal according to claim 1,
   wherein the Internet communication protocol is the Transmission Control Protocol/Internet Protocol,
   wherein the communication standard for communications by the storage terminal is the Communication Class,
   wherein the read/write standard for reading information from or writing information to the storage unit is the Mass Storage Class, and
   wherein the command for allowing the information processing apparatus to control the storage terminal as a peripheral device is a Small Computer System Interface command.

3. The storage terminal according to claim 1,
   wherein the communication unit exchanges the request or information according to the Universal Serial Bus standard.

4. A storage terminal comprising:
   a storage unit that stores first information and second information, the first information being information that is displayed according to a procedure defined in an Internet browser program, and the second information being information that is output according to a procedure defined in a program different from the Internet browser program;
   wherein the first information is information written in a markup language that is parsed by the Internet browser program, and wherein the second information includes at least one of data of music that is played back according to a procedure defined in a music processing program, data of an image that is displayed according to a procedure defined in an image processing program, and data of a document that is displayed according to a procedure defined in a document processing program;

a communication unit that carries out communications with an information processing apparatus on which the Internet browser program is executed; and a controlling unit that executes processing according to a request received from the information processing apparatus, by executing an Internet server program;

wherein when the request received from the information processing apparatus by the communication unit is a request specifying the first information or the second information, the controlling unit reads the specified first information or second information from the storage unit, and sends the first information or second information from the communication unit to the information processing apparatus according to a read/write standard for reading information from or writing information to the storage unit, wherein when the request received is a request generated by encapsulating specification information specifying the first information according to an Internet communication protocol used on the Internet and further encapsulating resulting data according to the read/write standard for reading information from or writing information to the storage unit, the controlling unit decapsulates the request to extract the specification information, and encapsulates apiece of first information specified by the specification information among the first information stored in the storage unit according to the Internet communication protocol, further encapsulates resulting data according to the read/write standard, and sends resulting data to the information processing apparatus, and wherein when the request received is a request generated by encapsulating specification information specifying the second information according to the Internet communication protocol and further encapsulating resulting data according to the read/write standard, the controlling unit decapsulates the request to extract the specification information, attaches a command for allowing the information processing apparatus to control the storage terminal as a peripheral device to a piece of second information specified by the specification information among the second information stored in the storage unit, encapsulates resulting data according to the read/write standard, and sends resulting data to the information processing apparatus.

5. The storage terminal according to claim 4, wherein the Internet communication protocol is the Transmission Control Protocol/Internet Protocol, wherein the read/write standard for reading information from or writing information to the storage unit is the Mass Storage Class, and wherein the command for allowing the information processing apparatus to control the storage terminal as a peripheral device is a Small Computer System Interface command.

6. An information processing apparatus comprising:

a storage unit that stores information;

a communication unit that carries out communications with a storage terminal on which an Internet server program is executed; and a controlling unit that reads specified information from the storage unit and that sends the specified information from the communication unit to the storage terminal according to a read/write standard for reading information from or writing information to the storage terminal, by executing an Internet browser program; wherein the specified information is encapsulated according to an Internet communication protocol used on the Internet, in response to sending the specified information to the storage terminal, the information processing apparatus is able to control the storage terminal as a peripheral device to a piece of information specified by the specified information among information stored in the storage terminal, and the information processing apparatus receives resulting data from the storage terminal according to the read/write standard for reading information from or writing information to the storage terminal, and the information stored in the storage terminal includes at least one of data of music that is played back according to a procedure defined in a music processing program, data of an image that is displayed according to a procedure defined in an image processing program, and data of a document that is displayed according to a procedure defined in a document processing program.

7. An information processing system comprising:

a storage terminal that executes an Internet server program; and an information processing apparatus that executes an Internet browser program;

wherein the storage terminal includes:

a storage unit that stores first information and second information, the first information being information that is displayed according to a procedure defined in the Internet browser program, and the second information being information that is output according to a procedure defined in a program different from the Internet browser program;

wherein the first information is information written in a markup language that is parsed by the Internet browser program, and wherein the second information includes at least one of data of music that is played back according to a procedure defined in a music Processing program, data of an image that is displayed according to a procedure defined in an image processing program, and data of a document that is displayed according to a procedure defined in a document processing program;

a communication unit that carries out communications with the information processing apparatus; and a controlling unit that executes processing according to a request received from the information processing apparatus, by executing the Internet server program, wherein when the request received from the information processing apparatus by the communication unit is a request specifying the first information, the controlling unit reads the specified first information from the storage unit, and sends the first information from the communication unit to the information processing apparatus according to a communication standard for communications by the storage terminal, and wherein when the request received from the information processing apparatus by the communication unit is a request specifying the second information, the controlling unit reads the specified second information from the storage unit, and sends the second information from the communication unit to the information processing apparatus according to a read/write standard for reading information from or writing information to the storage unit;

wherein when the request received is a request generated by encapsulating specification information specifying the first information according to an Internet communication protocol used on the Internet and further encapsulating resulting data according to the read/write standard for reading information from or writing information to the storage unit, the controlling unit decapsulates the request to extract the specification information, and encapsulates a piece of first information specified by the specification information among the first information stored in the storage unit according to the Internet communication protocol, further encapsulates resulting data according to the read/write standard, and sends resulting data to the information processing apparatus, and wherein when the request received is a request generated by encapsulating specification information specifying the second information according to the Internet communication protocol and further encapsulating resulting data according to the read/write standard, the controlling unit decapsulates the request to extract the specification information, attaches a command for allowing the information processing apparatus to control the storage terminal as a peripheral device to a piece of second information specified by the specification information among the second information stored in the storage unit, encapsulates resulting data according to the read/write standard, and sends resulting data to the information processing apparatus; and wherein the information processing apparatus includes:
  an executing unit that executes the Internet browser program;
  a sending unit that sends a request specifying the first information or the second information to the storage terminal; and
  a receiving unit that receives the first information or the second information sent from the communication unit of the storage terminal.

8. An information processing system comprising:
a storage terminal that executes an Internet server program; and
an information processing apparatus that executes an Internet browser program;
wherein the storage terminal includes:
  a storage unit that stores first information and second information, the first information being information that is displayed according to a procedure defined in the Internet browser program, and the second information being information that is output according to a procedure defined in a program different from the Internet browser program;
    wherein the first information is information written in a markup language that is parsed by the Internet browser program, and
    wherein the second information includes at least one of data of music that is played back according to a procedure defined in a music processing program, data of an image that is displayed according to a procedure defined in an image processing program, and data of a document that is displayed according to a procedure defined in a document processing program;
  a communication unit that carries out communications with the information processing apparatus; and
  a controlling unit that executes processing according to a request received from the information processing apparatus, by executing the Internet server program, wherein when the request received from the information processing apparatus by the communication unit is a request specifying the first information or the second information, the controlling unit reads the specified first information or second information from the storage unit, and sends the first information or second information from the communication unit to the information processing apparatus according to a read/write standard for reading information from or writing information to the storage unit;

wherein when the request received is a request generated by encapsulating specification information specifying the first information according to an Internet communication protocol used on the Internet and further encapsulating resulting data according to the read/write standard for reading information from or writing information to the storage unit, the controlling unit decapsulates the request to extract the specification information, and encapsulates a piece of first information specified by the specification information among the first information stored in the storage unit according to the Internet communication protocol, further encapsulates resulting data according to the read/write standard, and sends resulting data to the information processing apparatus, and wherein when the request received is a request generated by encapsulating specification information specifying the second information according to the Internet communication protocol and further encapsulating resulting data according to the read/write standard, the controlling unit decapsulates the request to extract the specification information, attaches a command for allowing the information processing apparatus to control the storage terminal as a peripheral device to a piece of second information specified by the specification information among the second information stored in the storage unit, encapsulates resulting data according to the read/write standard, and sends resulting data to the information processing apparatus; and wherein the information processing apparatus includes:
  an executing unit that executes the Internet browser program;
  a sending unit that sends a request specifying the first information or the second information to the storage terminal; and
  a receiving unit that receives the first information or the second information sent from the communication unit of the storage terminal.

9. An information processing system comprising:
a storage terminal that executes an Internet server program; and
an information processing apparatus that executes an Internet browser program;
wherein the information processing apparatus includes:
  a first storage unit that stores information;
  a communication unit that carries out communications with the storage terminal; and
  a controlling unit that reads specified information from the first storage unit and that sends the specified information from the communication unit to the storage terminal according to a read/write standard for reading information from or writing information to the storage terminal, by executing the Internet browser program; wherein the specified information is encapsulated according to an Internet communication protocol used on the Internet, in response to sending the s specified information to the storage terminal, the information processing apparatus is able to control the storage terminal as a peripheral device to a piece of information specified by the specified information among information stored in the storage terminal, the information processing apparatus receives resulting data from the storage terminal according to the read/write standard for reading information from or writing information to the storage terminal, and the information stored in the storage terminal includes at least one of data of music that is played back according to a procedure defined in a music processing program, data of an image that is displayed according to a procedure defined in an image processing program, and data of a document that is displayed according to a procedure defined in a document processing program; and wherein the storage terminal includes:
 a second storage unit that stores information;
 a communication unit that carries out communications with the information processing apparatus; and
 a controlling unit that stores information received from the information processing apparatus by the communication unit in the second storage unit, by executing the Internet server program.

* * * * *